United States Patent
Gupta

(10) Patent No.: US 8,589,345 B2
(45) Date of Patent: Nov. 19, 2013

(54) METHOD AND SYSTEM FOR PERFORMING OBJECT FILE MODIFICATIONS

(75) Inventor: Shivani Gupta, Haryana (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/427,418

(22) Filed: Mar. 22, 2012

(65) Prior Publication Data

US 2013/0254245 A1    Sep. 26, 2013

(51) Int. Cl.
*G06F 17/30* (2006.01)

(52) U.S. Cl.
USPC .......................................... 707/625; 707/915

(58) Field of Classification Search
None
See application file for complete search history.

(56) References Cited

U.S. PATENT DOCUMENTS

| | | | | |
|---|---|---|---|---|
| 5,909,689 | A * | 6/1999 | Van Ryzin | 1/1 |
| 6,026,417 | A * | 2/2000 | Ross et al. | 715/210 |
| 6,588,011 | B1 * | 7/2003 | Giammaria | 717/174 |
| 6,879,996 | B1 * | 4/2005 | Laves | 709/206 |
| 7,065,249 | B2 * | 6/2006 | Fushiki et al. | 382/167 |
| 2002/0184269 | A1 * | 12/2002 | Imagou | 707/523 |
| 2006/0031452 | A1 * | 2/2006 | Shiimori | 709/223 |
| 2006/0170707 | A1 * | 8/2006 | Kokemohr | 345/629 |
| 2007/0269119 | A1 * | 11/2007 | Hyerle et al. | 382/236 |
| 2009/0116668 | A1 * | 5/2009 | Davidson | 381/119 |
| 2011/0247011 | A1 * | 10/2011 | Wu et al. | 719/316 |
| 2012/0047434 | A1 * | 2/2012 | Ginetti | 715/255 |
| 2012/0246114 | A1 * | 9/2012 | Edmiston et al. | 707/625 |
| 2012/0284646 | A1 * | 11/2012 | Sitrick et al. | 715/753 |

OTHER PUBLICATIONS

Panic, Mike, "Pixlr: A Cloud based Photoshop alternative?," Jul. 9, 2010, http://thephotoletariat.com/pixlr-a-cloud-based-photoshop-alternative/#comments, accessed Mar. 20, 2012.*

* cited by examiner

*Primary Examiner* — Debbie Le
*Assistant Examiner* — Richard Bowen
(74) *Attorney, Agent, or Firm* — Moser Taboada

(57) ABSTRACT

A method and apparatus for performing object modifications by using change-specific executable files comprises accessing at least one modification stub associated with an object file, wherein the modification stub comprises an instruction for modifying the object file, wherein the instruction identifies an element in the object file and defines instructions for modifying the identified element; applying a selected modification stub to the object file; and modifying the object file per the instruction contained in the modification stub.

13 Claims, 4 Drawing Sheets

METHOD AND SYSTEM FOR PERFORMING OBJECT FILE MODIFICATIONS

BACKGROUND OF THE INVENTION

1. Field of the Invention

Embodiments of the present invention generally relate to cloud computing and, more particularly, to a method and system for performing object file modifications on a cloud server.

2. Description of the Related Art

In the world of content creation, creative professionals work with clients to design websites, edit documents and images, or create electronic publications, professional videos, or interactive content. After the initial design is created, the creative professional uploads the design and the professional and the client discuss modifications to the content. This process may involve much iteration. With each iteration, the client may approve the changes, request some changes be removed, or request additional changes.

Conventional techniques require the creative professional to apply the changes requested by the client and upload a current version of the file to a cloud server, even when the client may only need to see the result of a single change request. A client may ask for five different types of changes and the creative professional may have three suggestions for each change. In this example, the professional would have to upload fifteen versions of the same file for the client to assess all modification options. This can cost a significant amount of storage space on a computer in addition to significant upload and download time. As a result, the overall system suffers from unnecessary network traffic, higher bandwidth utilization, performance degradation, poor response time and the like.

Therefore, there is a need for an improved method and system for performing object modifications on an object file residing on a cloud server.

SUMMARY OF THE INVENTION

Embodiments of the present invention generally relate to a method and system for performing object file modifications using change-specific executable files. The method comprises receiving an object file and at least one modification stubs, wherein each modification stub comprises an instruction to modify the object file. The method executes a request to apply a selected modification stub to the object file, and modifies the object file per the instruction.

Figure 1:
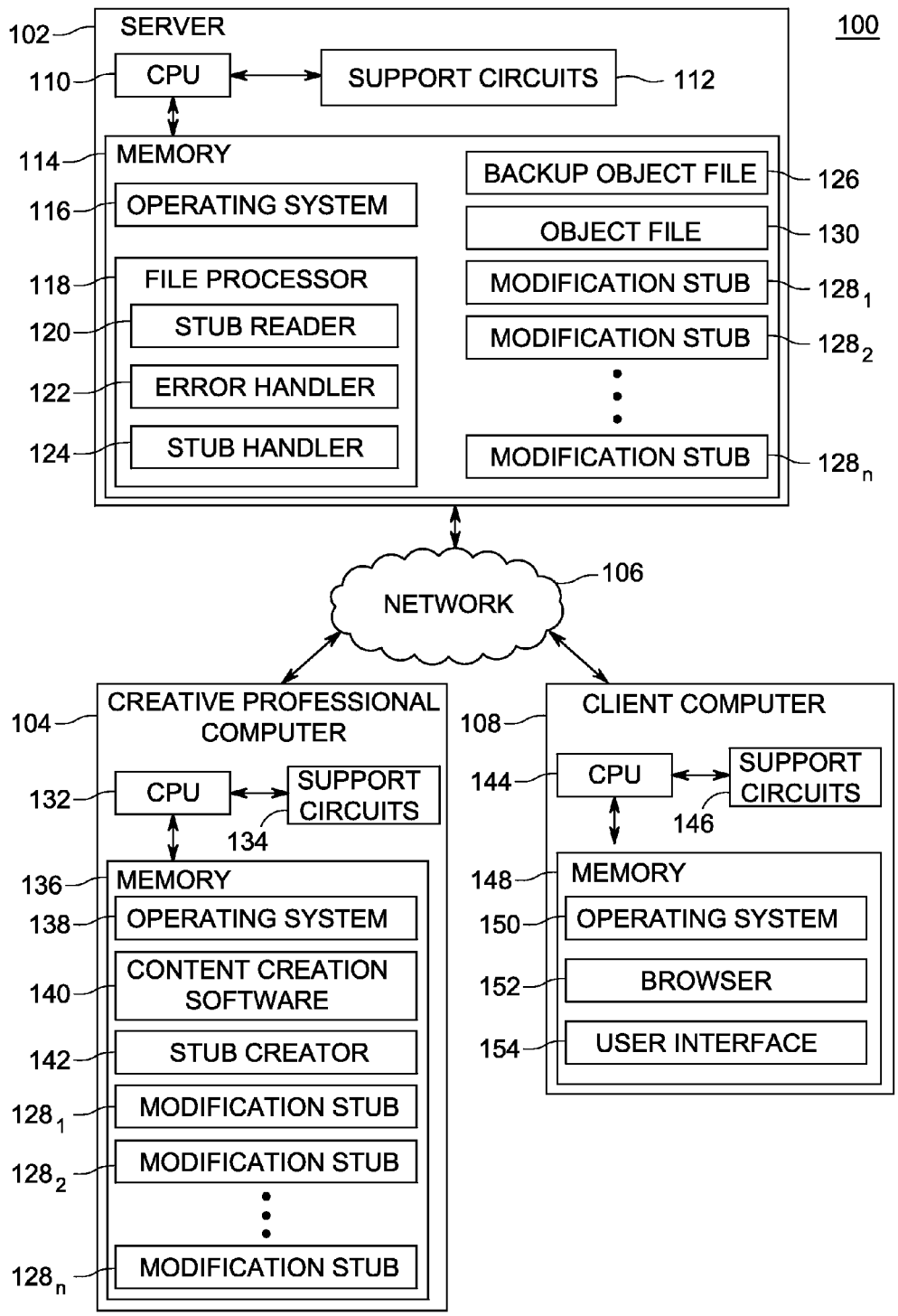
FIG. 1 depicts a system for performing object file modifications using change-specific executable files, according to one or more embodiments of the invention.

While the method and system is described herein by way of example for several embodiments and illustrative drawings, those skilled in the art will recognize that the method and system for performing object modifications using change-specific executable files is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for performing object modifications using change-specific executable files as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and system for performing object file modifications using change-specific executable files. Object files may comprise any number of elements. The elements may be of different types. For example, an object file may be a photograph of a train at sunset with the train in the foreground of the photograph and mountains in the background. In this example, elements contained in the object file may be a train body; the train body comprising elements of a box car, a front wheel and a back wheel. Other elements defined in the object may be the sunset and the mountains. In some embodiments, each of the elements may be defined using x and y coordinates that identify a path to the element. Elements may be modified in many different ways. The sunset may be enhanced to deepen its colors. The mountains may be scaled to increase or decrease their visual impact. The train and/or the elements of the train may be resized or colored. Alternatively, different effects may be added such as making the train element appear as a pencil sketch and/or the sunset appear to be drawn with pastels. In the embodiments of the present invention, each of the modifications to the object file, in this example, the train photograph, is defined in a modification stub. The embodiments perform object file modifications using modification stubs created by a creative professional. In some embodiments, each modification stub contains a single change that is to be applied to a specific element of the object file, although in other embodiments, multiple changes could be contained therein. The modification stubs can be applied to the object and/or removed, thereby allowing a user to see the result of applying different modifications to the object. The user may apply a modification and then undo the change, or change the order in which modifications are applied to see how different sequences of changes appear on or affect the final object.

Various embodiments of an system and method for performing object file modifications using change-specific executable files are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure description of the claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a system for performing object file modifications using change-specific executable files, according to one or more embodiments of the invention. The system 100 comprises a server 102, a creative professional computer 104, and a client computer 108, coupled to each other through a network 106.

The server 102 is a type of computing device known to one of ordinary skill in the art that is used for providing computing services within the cloud, e.g., a blade server, virtual machine, and the like. Although the embodiments discussed here involve a cloud server, one skilled in the art will appreciate the invention may also be performed on the client computer 108. The CPU 110 may comprise one or more commercially available microprocessors or microcontrollers that facilitate data processing and storage. The various support circuits 112 facilitate the operation of the CPU 110 and include one or more clock circuits, power supplies, cache, input/output circuits, displays, and the like. The memory 114 comprises at least one of Read Only Memory (ROM), Random Access Memory (RAM), disk drive storage, optical storage, removable storage and/or the like. The memory 114 comprises a operating system 116, a file processor 118, an object file 130, a backup object file 126, and a plurality of modification stubs $128_1, 128_2 \ldots 128_n$ (collectively 128), which are received from a creative professional computer 104. The file processor 118 comprises a stub reader 120, an error handler 122, and a stub handler 124.

The creative professional computer 104 is a type of computing device (e.g., a laptop, a desktop, a Personal Digital Assistant (PDA), a tablet, a mobile phone and/or the like) known to one of ordinary skill in the art. The CPU 132 may comprise one or more commercially available microprocessors or microcontrollers that facilitate data processing and storage. The various support circuits 134 facilitate the operation of the CPU 132 and include one or more clock circuits, power supplies, cache, input/output circuits, displays, and the like. The memory 136 comprises at least one of Read Only Memory (ROM), Random Access Memory (RAM), disk drive storage, optical storage, removable storage and/or the like. The memory 136 comprises an operating system 138, content creation software 140, a stub creator 142 and a plurality of modification stubs $128_1, 128_2 \ldots 128_n$ (collectively 128). Each stub identifies a single element in the object file 130 and a single change to that element. According to some embodiments, the operating system (OS) 138 generally manages various computer resources (e.g., network resources, browsers, user-interface module, plug-in and/or the like). The operating system 138 is configured to execute operations on one or more hardware and/or software modules, such as Network Interface Cards (NICs), hard disks, virtualization layers, firewalls and/or the like.

The content creation software 140 may be any software application, such as ADOBE® Illustrator, ADOBE® PHOTOSHOP®, ADOBE® InDesign, ADOBE® Acrobat, ADOBE® AfterEffects, ADOBE® Edge, ADOBE® Flash, ADOBE® Muse, ADOBE® DreamWeaver, and the like, capable of creating the type of object file 130 that is requested by the client. For example, the object file 130 could be a web design, an image, an artwork, a document, an electronic publication, a professional video, interactive content, animation, and/or the like. As described above, the object file 130 is comprised of a plurality of elements, which can be modified using the modification stubs.

The client computer 108 is a type of computing device (e.g., a laptop, a desktop, a Personal Digital Assistant (PDA), a tablet, a mobile phone and/or the like) known to one of ordinary skill in the art. The CPU 144 may comprise one or more commercially available microprocessors or microcontrollers that facilitate data processing and storage. The various support circuits 146 facilitate the operation of the CPU 144 and include one or more clock circuits, power supplies, cache, input/output circuits, displays, and the like. The memory 148 comprises at least one of Read Only Memory (ROM), Random Access Memory (RAM), disk drive storage, optical storage, removable storage and/or the like. The memory 148 further comprises an operating system 150, a browser 152, and a user interface 154. According to some embodiments, the operating system (OS) 150 generally manages various computer resources (e.g., network resources, file processors, agents, virtual file generators and/or the like). The operating system 150 is configured to execute operations on one or more hardware and/or software modules, such as Network Interface Cards (NICs), hard disks, virtualization layers, firewalls and/or the like.

According to some embodiments, the browser 152 accesses a file (e.g., the object file 130) residing on the server 102. The browser 152 includes a software application for accessing Internet resources (e.g., domain names, Uniform Resource Locators (URLs), and/or the like) and displays contents associated with the Internet resources using the user interface 154. The resources may further be identified through Uniform Resource Identifier (URI) and/or may be a web page, image, video, or other piece of content. The browser 152 may include, but is not limited to, Windows Internet Explorer (IE), Mozilla Firefox, Apple Safari, Google Chrome, Opera, Internet Explorer Mobile (IE), jB5, WebOS, Opera Mobile, and/or the like.

According to one or more embodiments, the user interface module 154 may be a Graphical User Interface (GUI), a Command Line Interface (CLI) and/or other user interface that facilitates communication with a client. The user interface module 154 enables a user to identify one or more modification stubs 128 to be applied to the object file 130.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure, such as Ethernet, Wi-Fi, Wi-Max, General Packet Radio Service (GPRS), and the like.

According to some embodiments of the invention, the object file 130 may be a document (.pdf, .doc, .xls, and the like), image, video, audio, animation, interactive content, multimedia, and the like. In some embodiments, the object file 130 is created using the content creation software 140 on the creative professional computer 104. In other embodiments, the object file is provided from a third party. The object file 130 is made up of one or more elements which may be modified. In one embodiment, where the object is an illustration, elements may include a background, figures, lines, and the like. A user may communicate to the creative professional modifications to be made to the object file. In this embodiment of the invention, a user may request a certain effect on a background in the object file 130. For each modification requested, the creative professional may have multiple suggestions for how to address the request. The stub creator 150 creates a modification stub 128 for each suggestion the professional has for each modification requested. In one embodiment, if the object file 130 is a binary file, e.g., a video, the modification stub 128 may be a binary stub. If the object file 130 is an XML file, the modification stub 128 may be a XML stub. However, in some embodiments, the modification stubs 128 are generic and may be applied to any object file type regardless of the modification stub type. The stub handler 124 parses the modification stub 128 so it may be applied to the object file 130. The modification stub 128 is named in a way that identifies which specific object file is modified and how it is being modified. The modification stub 128 contains information that identifies an element in the object file 130 and instructions to modify that element. For example, if the object file 130 is a video, the modification stub 128 may contain an instruction to delete a frame of the video. In this example, the modification stub would contain the frame index metadata with the action "delete". The modification stubs 128 are created on the creative professional computer 104 and uploaded to the server 102.

Through the user interface 154, a user may select one or more modification stubs 128 to be applied to the object file 130. When more than one modification stub 128 is selected to be applied to the object file 130, the user may indicate a preferred order in which to apply the modification stubs 128. In one embodiment, the stub contains a single change to a single element in the object file 130. For example, the object file 130 may be an artwork. The modification may involve some effect on the background of an artwork. The user may select the modification stub 128 to be applied to the object file that adds a texture to the background or select a modification stub 128 that changes the color of the background. Alternatively, a modification stub 128 may remove an element from the background such as a bird or a cloud. Modification stubs 128 may be applied in any order. As such, one modification stub 128 may contain instructions to modify an element of the object file 130 that another modification stub 128 has previously removed. Therefore, before a modification stub 128 is applied to the object file 130, the stub reader 120 determines whether the element to be modified by the modification stub 128 still exists. If it does not, the error handler 122 displays a message to the user that the change cannot be made.

If the element exists, the stub handler 124 applies the modification stub 128 to the object file 130 and the change is made. The user then has the option to undo the change. The file processor 118 maintains a backup object file 126 which is a version of the object file before the last modification stub 128 is applied. When the user exercises the option to undo a change, the file processor 118 copies the backup object file 126 to the object file 130 and continues processing the object file 130 per the user requests. It is to be understood that although in the above described embodiment each stub contains instructions to make a single modification to an object, in other embodiments of the invention, a modification stub 128 may contain instructions to make multiple changes to an object, such a "remove the bird" and "change background to blue."

Figure 2:
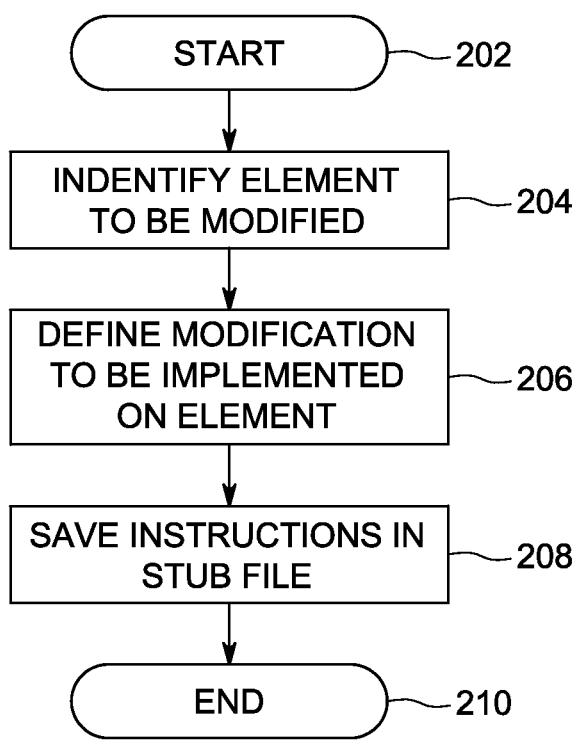
FIG. 2 depicts a flow diagram of a method for creating a modification stub as performed by the stub creator of FIG. 1, according to one or more embodiments of the invention.

FIG. 2 depicts a flow diagram of a method 200 for creating a modification stub as performed by the stub creator 142 on the content professional computer 104 of FIG. 1, according to one or more embodiments of the invention. An element in the object file is identified and the modification to that element is defined. This information is then saved in a modification stub that is named in such a way as to identify the object file with which it is associated, the element in the object file that the stub is written to modify, and the type of modification to be performed on the element.

The method 200 starts at step 202 and proceeds to step 204. At step 204, an element to be changed is identified. In some embodiments of the invention, the element is identified using x and y coordinate values defining the path to the element in the object file. The method 200 proceeds to step 206. At step 206, the method 200 defines the modification to be made on the element. Returning to our train photograph example, a color modification may be made the box car of the train. In addition, the opacity of the color or a gradient may be defined. The train element may be rotated by a defined angle, or scaled, or duplicated. Any modification supported by the content creation software may be defined for the element. The method 200 proceeds to step 208.

At step 208, the method 200 saves the instructions in a modification stub. The modification stub will be named in such a way as to identify the object file with which it is associated, the element of the object file it modifies, and the modification to be made to the element. The file may be saved in any format such that the modification stub can be parsed and applied to the object file, including, but not limited to an XML or binary format.

Below is an exemplary embodiment of a modification stub.

```
<?xml version="1.0" encoding="utf-8"?>
  <Stub>
    <Element>
      <Group ai:artboardIndex="1" ai:seqID="11">
        <Group ai:objID="32a289e0">
          <Group x="349.425" y="9.5" ai:objID="217d5c40">
            <Path x="0.577148" y="0.5" />
          </Group>
        </Group>
      </Group>
    </Element>
    <stroke>
      <SolidColorStroke weight="1" caps="none" joints="bevel" />
    </stroke>
  <stub>
```

In this example, the object file contains a polygon. The modification stub locates the element to be modified at path x="0.577148" y="0.5". Once located, the instruction Solid-ColorStroke weight="1" caps="none" joints="bevel", changes the joints of the polygon to "bevel".

The following is an example of a modification stub containing multiple changes to the object file.

```
<?xml version="1.0" encoding="utf-8"?>
<Stub>
    <Action>
        <Element>
            <Group ai:artboardIndex="0" ai:seqID="1">
                <Group ai:objID="21464060">
                    <RichText x="25" y="277.488" ai:objID="2148ec90" />
                </Group>
            </Group>
        </Element>
        <Content>
            <p fontfamily="TimesNewRoman" d:id="8">
        </Content>
    <Action>
        <Element>
            <Group ai:artboardIndex="1" ai:seqID="11">
                <Group ai:objID="32a289e0">
                    <Group x="349.425" y="9.5" ai:objID="217d5c40">
                        <Path x="0.577148" y="0.5" />
                    </Group>
                </Group>
            </Group>
        </Element>
        <stroke>
            <SolidColorStroke weight="1" caps="none" joints="bevel" />
        </stroke>
    </Action>
</stub>
```

The modification stub has two modifications; one which changes the "joints" value to "bevel", and a second which changes the "fontfamily" to RichText. The method 200 proceeds to step 210 and ends.

Figure 3:
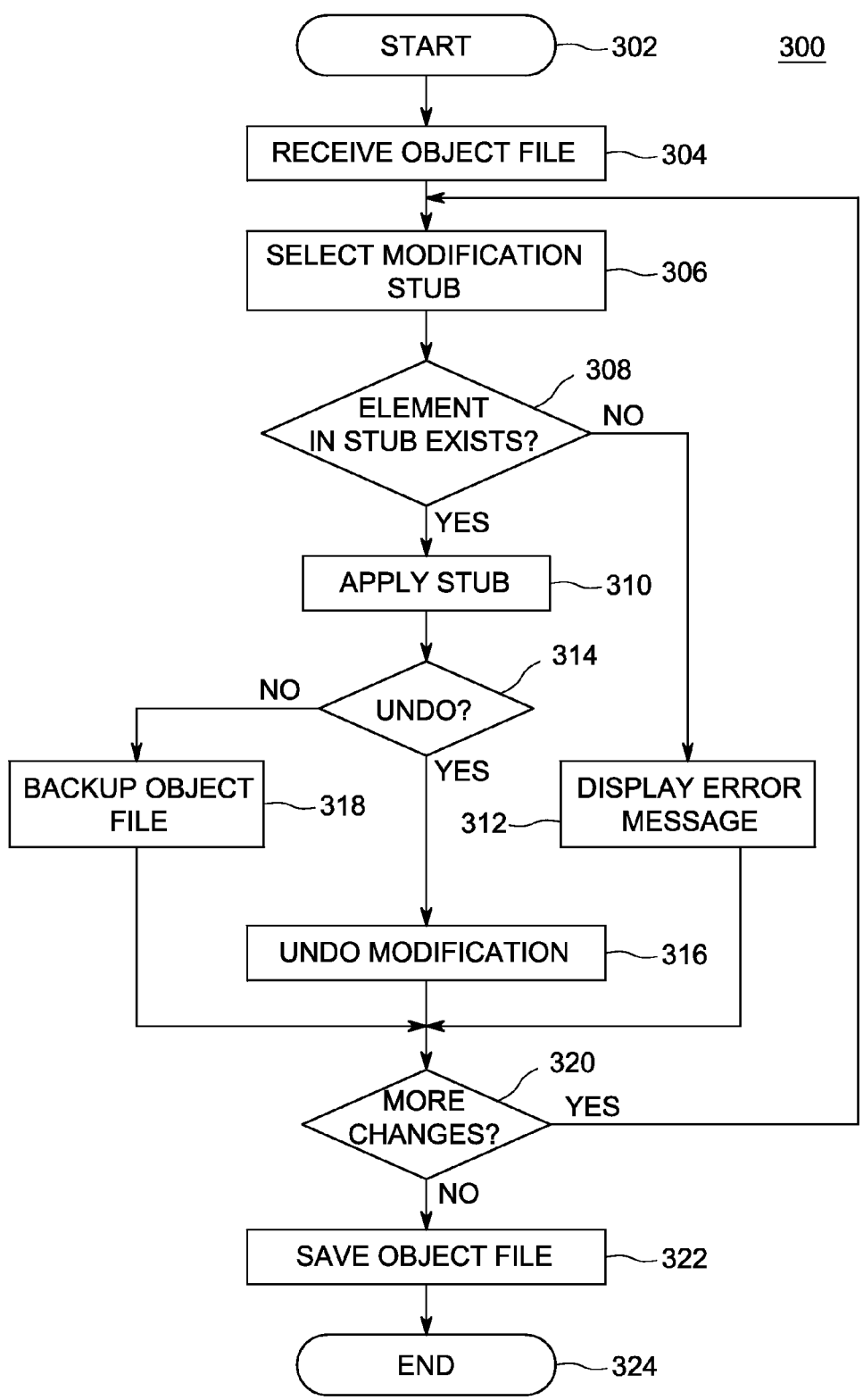
FIG. 3 depicts a flow diagram of a method for performing object file modifications using change-specific executable files as performed by the modification module of FIG. 1, according to one or more embodiments of the invention.

FIG. 3 depicts a flow diagram of a method 300 for modifying objects using change-specific modification stubs as performed by the file processor 118 of FIG. 1, according to one or more embodiments of the invention. FIG. 3 depicts a flow diagram of a method 300 for applying modification stubs to an object file. A request will come from the user to have a modification stub 128, which was created on the content professional computer 104, applied to the object file 130 on the server 102. After the modification stub is applied, the user may opt to undo the change, apply additional modification stubs, or save the object file.

The method 300 starts at step 302 and proceeds to step 304. At step 304, the method 300 accesses an object. The object may be a document (.pdf, .doc, .xls, and the like), image, video, audio, animation, interactive content, multimedia, and the like. The object file is copied to a backup object file which may be used later, should the user opt to undo a modification. The method 300 proceeds to step 306. At step 306, a modification stub is selected. The modification stub is named in such a way to identify what object it modifies, which element is changed in the file, and how that element will be changed. In some embodiments, each modification stub makes a single change to a single element of the object although, as previously noted, multiple changes could be made in other embodiments of the invention. The method 300 proceeds to step 308.

At step 308, the method 300 reads the modification stub that identifies which element of the object is going to be changed. Because the modification stubs can be applied in any order, a previous stub may have removed the element that is currently selected for modification. As such, the method 300 determines whether the element to be modified currently exists. If the element does not exist or cannot otherwise be modified, the method 300 proceeds to step 312. At step 312, the method 300 displays an error message informing the user that the modification was not suitable to the current object and then proceeds to step 320. If the element was found in the object, at step 308, the method 300 proceeds to step 310. At step 310, the method 300 modifies object per the instructions in the modification stub. The method 300 proceeds to step 314.

At step 314, the method 300 offers the user an option to undo the change made by the modification stub. If the user opts of undo the change made by the modification stub, the method 300 proceeds to step 316. At step 316, the backup object file is copied to the object file. The backup object file contains a copy of the object file before the application of the last modification. The method 300 proceeds to step 320.

If, at step 314, the user opts to keep the change made by the modification stub, method 300 proceeds to step 318. At step 318, the method 300 backs up the object file by copying the object file to the backup object file. The method 300 proceeds to step 320.

At step 320, the method 300 determines whether the user is applying additional modification stubs. If the user opts to apply additional stubs, the method 300 proceeds to step 306 and the process iterates. If, at step 320, the method 300 determines the user is not applying additional modification stubs, the method 300 proceeds to step 322. At step 322, the method 300 saves the object file. The method 300 proceeds to step 324 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
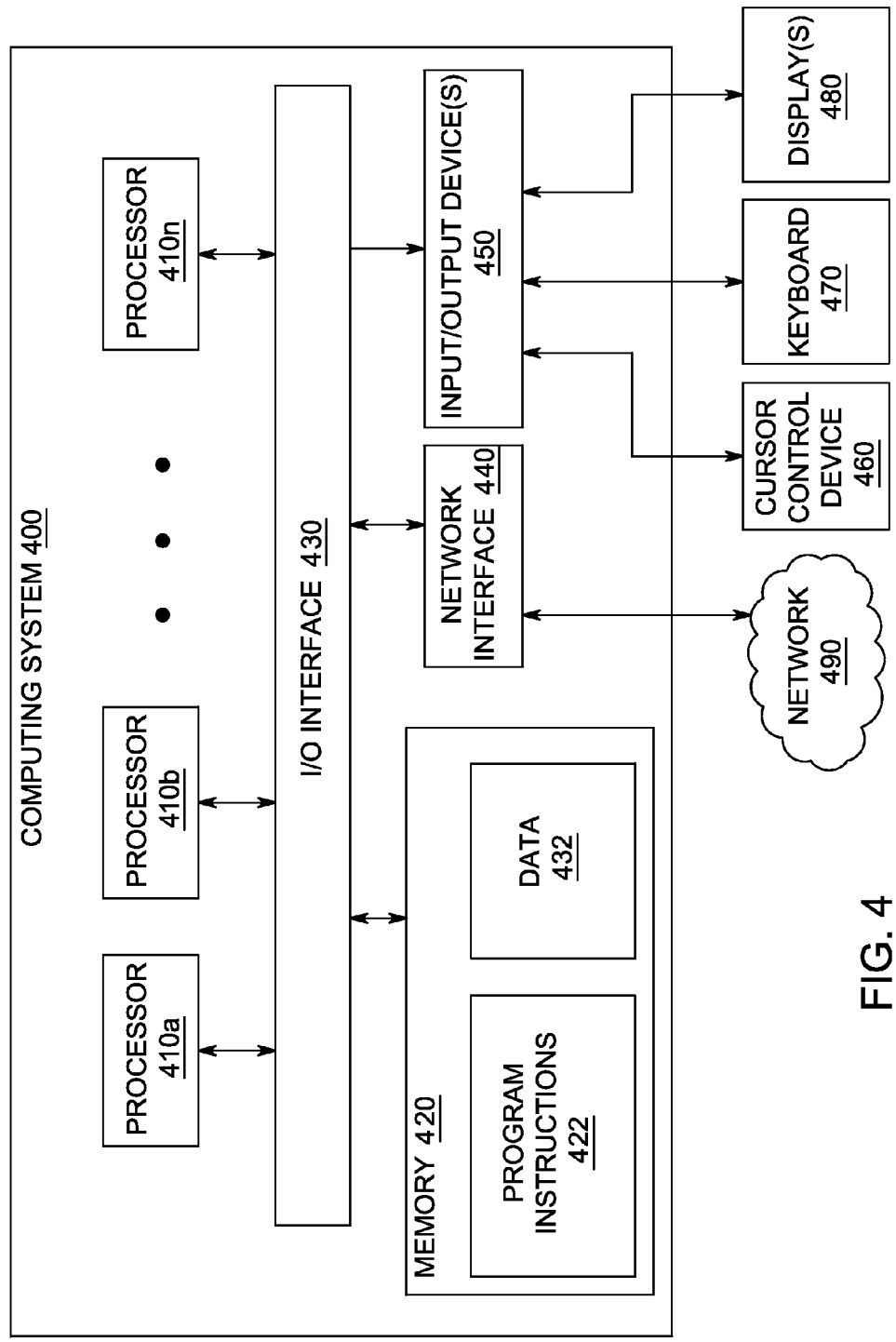
FIG. 4 depicts a computer system that can be utilized in various embodiments of the present invention, according to one or more embodiments.

FIG. 4 depicts a computer system that can be utilized in various embodiments of the present invention, according to one or more embodiments.

Various embodiments of an system and method for performing object modifications, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement methods 200 and 300, as processor-executable executable program instructions 422 (e.g., program instructions executable by processor(s) 410) in various embodiments.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450, In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowcharts of FIGS. 2 and 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method of performing object file modifications comprising:

accessing at least one pre-defined modification stub associated with an object file, wherein the at least one pre-defined modification stub and the object file co-reside on a cloud server, wherein the at least one pre-defined modification stub is an executable file, and wherein the at least one pre-defined modification stub comprises an instruction for non-destructively modifying the object file, wherein the instruction identifies an element in the object file and defines instructions for modifying the identified element, wherein identifying an element comprises parsing the modification stub to determine an object ID that defines the element and x and y coordinates that identify a path to the defined element;

applying a selected pre-defined modification stub to the object file; and non-destructively modifying the object file per the instruction contained in the pre-defined modification stub.

2. The method of claim 1, wherein the at least one pre-defined modification stub can be a plurality of pre-defined modification stubs applied to the object file in any order.

3. The method of claim 1, wherein the instruction includes multiple modifications to one or more elements.

4. The method of claim 1, wherein the modification of the object file can be reversed.

5. The method of claim 1, wherein accessing, applying, and modifying are performed on a cloud-based server.

6. A non-transient computer readable medium for storing computer instructions that, when executed by at least one processor cause the at least one processor to perform object file modifications comprising:

accessing at least one pre-defined modification stub associated with an object file, wherein the at least one pre-defined modification stub and the object file co-reside on a cloud server, wherein the at least one pre-defined modification stub is an executable file, and wherein the at least one pre-defined modification stub comprises an instruction for non-destructively modifying the object file, wherein creating the accessed modification stub comprises identifying an element in an object file to be modified and an instruction for modifying the identified element, and wherein identifying an element comprises parsing the modification stub to determine an object ID that defines the element and x and y coordinates that identify a path to the defined element;

applying a selected pre-defined modification stub to the object file; and non-destructively modifying the object file per the instruction contained in the pre-defined modification stub.

7. The computer readable medium of claim 6, wherein creating the accessed modification stub further comprises:

defining a modification stub containing the instruction and an identification of the element, where the modification stub is adapted to be selectively executed to perform the modification.

8. The computer readable medium of claim 6, wherein accessing, applying, and modifying are performed on a cloud-based server.

9. A system for performing object file modification, the system comprising:

one or more processors; and a memory coupled to the one or more processors, the memory having instructions which, when executed by the one or more processors, cause the one or more processors to:

access at least one pre-defined modification stub associated with an object file, wherein the at least one pre-defined modification stub and the object file co-reside on a cloud server, wherein the at least one pre-defined modification stub is an executable file, and wherein the at least one pre-defined modification stub comprises an instruction for non-destructively modifying the object file, wherein the instruction identifies an element in the object file and defines instructions for modifying the identified element, wherein identifying an element comprises parsing the modification stub to determine an object ID that defines the element and x and y coordinates that identify a path to the defined element;

apply a selected pre-defined modification stub to the object file; and non-destructively modify the object file per the instruction contained in the pre-defined modification stub.

10. The system of claim 9, wherein the at least one pre-defined modification stub can be a plurality of pre-defined modification stubs applied to the object file in any order.

11. The system of claim 9, wherein the instruction includes multiple modifications to one or more elements.

12. The system of claim 9, wherein the modification of the object file can be reversed.

13. The system of claim 9, wherein accessing, applying, and modifying are performed on a cloud-based server.

* * * * *